(12) United States Patent
Urivskiy et al.

(10) Patent No.: US 7,773,748 B2
(45) Date of Patent: Aug. 10, 2010

(54) METHOD FOR MAKING SEED VALUE USED IN PSEUDO RANDOM NUMBER GNERATOR AND DEVICE THEREOF

(75) Inventors: Alexey V. Urivskiy, Moscow (RU); Andrey L. Chmora, Moscow (RU); Alexey Bogachov, Moscow (RU); Mikhail Nekrasov, Moscow (RU); Sergey Zakharov, Moscow (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 1352 days.

(21) Appl. No.: 11/235,546

(22) Filed: Sep. 27, 2005

(65) Prior Publication Data

US 2006/0067527 A1   Mar. 30, 2006

(30) Foreign Application Priority Data

Sep. 27, 2004   (RU) ............................... 2004128637

(51) Int. Cl.
    *H04L 9/22* (2006.01)
(52) U.S. Cl. ....................................................... 380/46
(58) Field of Classification Search .................. 380/46, 380/47, 262, 268
    See application file for complete search history.

(56) References Cited

U.S. PATENT DOCUMENTS

| 2002/0131592 A1* | 9/2002 | Hinnant ....................... 380/46 |
| 2002/0143495 A1* | 10/2002 | Roser ......................... 702/179 |
| 2003/0063742 A1* | 4/2003 | Neufeld et al. ................. 380/46 |
| 2004/0076293 A1* | 4/2004 | Smeets et al. .................. 380/46 |

* cited by examiner

*Primary Examiner*—Ellen Tran
(74) *Attorney, Agent, or Firm*—NSIP Law

(57) ABSTRACT

A seed value making method and device for a PRNG (Pseudo Random Number Generator) are provided. The seed value making method includes the steps of: accumulating in memory units of a First Data Pool data from various external sources, analyzing the data to determine a source type, computing entropy estimations for each of the external sources basing on the source type as determined, and generating a seed value by using the entropy estimations and the data accumulated in the memory units of the First Data Pool. Accordingly, in generating a seed value, dynamic estimation of random sources rate, and classification of sources on slow and fast ones, and reliable and unreliable ones, can be provided, and also, seed values can be made with taking in account rate and reliability of the sources.

13 Claims, 2 Drawing Sheets

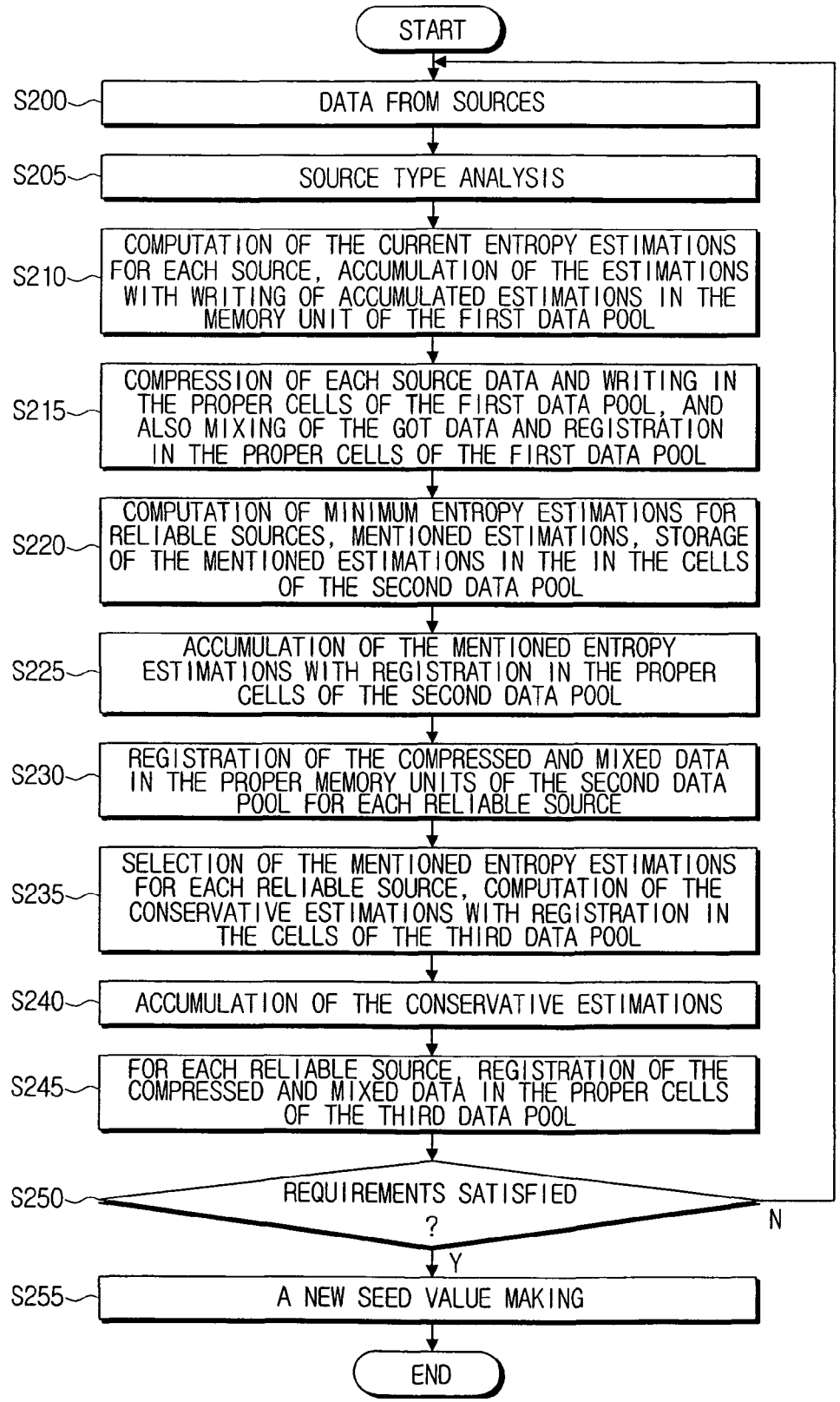

METHOD FOR MAKING SEED VALUE USED IN PSEUDO RANDOM NUMBER GNERATOR AND DEVICE THEREOF

CROSS-REFERENCE OF RELATED APPLICATIONS

This application claims benefit under 35 U.S.C. §119 from Russian Patent Application No. 2004128637 filed Sep. 27, 2004, and Korean Patent Application No. 2005-88963, filed Sep. 23, 2005, the entire contents of which are incorporated herein by reference.

BACKGROUND OF THE INVENTION

1. Field of the Invention

The present invention relates to a method of making seed value of a pseudo random number generator (PRNG) and a device thereof. More particularly, the present invention relates to a method of making seed value of a PRNG for use in various encryption systems, and a device thereof.

2. Description of the Related Art

Random number generation is needed to solve a variety of problems. The random numbers are used in the simulation modeling, generation of passwords and cryptographic keys for various systems of cryptographic data protection. The known PRNGs for pseudo random sequence of bits generation use some types of chaotic systems.

Signals received from these systems are digitized and presented in a binary form. This bit sequence is hashed for a shorter bit sequence, which is used as a seed value for PRNG.

The PRNG generates pseudo random numbers that are used in cryptographic systems. Random sources entropy is estimated experimentally, and the further measurements are performed depending on the estimated results.

As shown in a seed value generator disclosed in U.S. Pat. No. 5,732,138 (24 Mar. 1998), a conventional seed value generator uses random data received from different chaotic systems.

However, this device has low performance. Besides that, it is not possible to use the random data when the specified sources have various rates of entropy bits generation.

The conventional seed value generator also does not classify the sources according to reliability and rate. In this case, it is impossible to control the sources.

In another example of conventional seed value generators, a seed value generator disclosed in U.S. Pat. No. 5,778,069 (7 Jul. 1998) gets data from various types of sources, combines data from different sources, hashes the received data and generates the seed for PRNG based on the received data.

However, this device cannot be used when the determined sources have different rates of entropy bits generation, because this device does not perform dynamic estimation of source rate while this is essential for entropy evaluation. Besides that, the device does not classify sources according to their reliability.

Therefore, a device and method for creation of seed values are required, which can provide dynamic estimation of random sources rate, classification of sources on slow and fast ones, reliable and unreliable, and also making seed values taking in account rate and reliability of the sources.

SUMMARY OF THE INVENTION

Accordingly, it is an object of the present invention to provide a device and method for creation of seed values, which is capable of providing dynamic estimation of random sources rate, classification of sources on slow and fast ones, reliable and unreliable, and also making seed values taking in account rate and reliability of the sources.

The above aspects and/or other features of the present invention can substantially be achieved by providing a seed value making method for a PRNG (Pseudo Random Number Generator), comprising: accumulating in memory units of a First Data Pool data from various external sources; analyzing the data to determine a source type; computing entropy estimations for each of the external sources basing on the source type as determined; and generating a seed value by using the entropy estimations and the data accumulated in the memory units of the First Data Pool.

The data may preferably be values of signal levels in a WLAN network, intervals between the incoming packets in a local network, intervals between the packets outgoing from the local network, intervals between the interruptions, quantity of the mentioned interruptions.

The seed value may be generated at the moment of switching on an external device.

The First Data Pool may represent segments of continuous address space of a memory array with random access.

The entropy estimations may be computed according to the formula as follows:

$$H(\cdot) = -\sum_i p_i \log p_i,$$

in which $p_i$ is probability calculated basing on frequency of random event appearance within certain period of time.

The source type comprises one of: fast and reliable (FR), slow and reliable (SR), fast and unreliable (FU), slow and unreliable (SU).

According to one aspect of the present invention, a device for forming a seed value for a PRNG (Pseudo Random Number Generator), includes a data source analysis device to receive data from sources and determine sources type basing on the received data, and also perform entropy calculations for each of the sources, a data compression device to compress data received from the mentioned devices; a data mixing device to receive the compressed data from the data compression device and mix the received compressed data; an entropy estimation summation device to sum the entropy estimations for each of the sources; a device for data accumulation and entropy estimation forming, to accumulate the data from each of the sources; and a device for a new seed value making, to generate a seed value using the entropy estimations and the accumulated data.

The data may preferably be values of signal levels in a WLAN network, intervals between the incoming packets in a local network, intervals between the packets outgoing from the local network, intervals between the interruptions, quantity of the mentioned interruptions.

The device for a new seed value making may generate the seed value at the moment of switching on an external device constituting the local network.

The data source analysis device comprises a device for frequency registration of random events, which is determined for registration of random events of the sources within a predetermined period of time; and a device for current entropy estimation computation, which is determined for calculation of current entropy estimations on the basis of the mentioned frequencies according to the formula as follows:

$$H(\cdot) = -\sum_i p_i \log p_i,$$

in which $p_i$ is probability calculated basing on frequency of random event appearance within a certain period of time.

The data source analysis device may compute the current entropy estimations on the basis of random event frequency of the sources according the formula as follows:

$$H(\cdot) = -\sum_i p_i \log p_i,$$

in which $p_i$ is a probability calculated basing on frequency of random event appearance within a certain period of time.

The frequency of random event appearance is registered in an external device provided for the registration of the frequency of random event appearance.

The source type comprises one of: fast and reliable (fr), slow and reliable (sr), fast and unreliable (fu), slow and unreliable (su).

BRIEF DESCRIPTION OF THE DRAWINGS

The above aspects and features of the present invention will be more apparent by describing certain embodiments of the present invention with reference to the accompanying drawings, in which:

FIG. 2 is a flowchart illustrating the operational principle of a seed value making method according to an embodiment of the present invention.

DETAILED DESCRIPTION OF THE EXEMPLARY EMBODIMENTS

Figure 1:
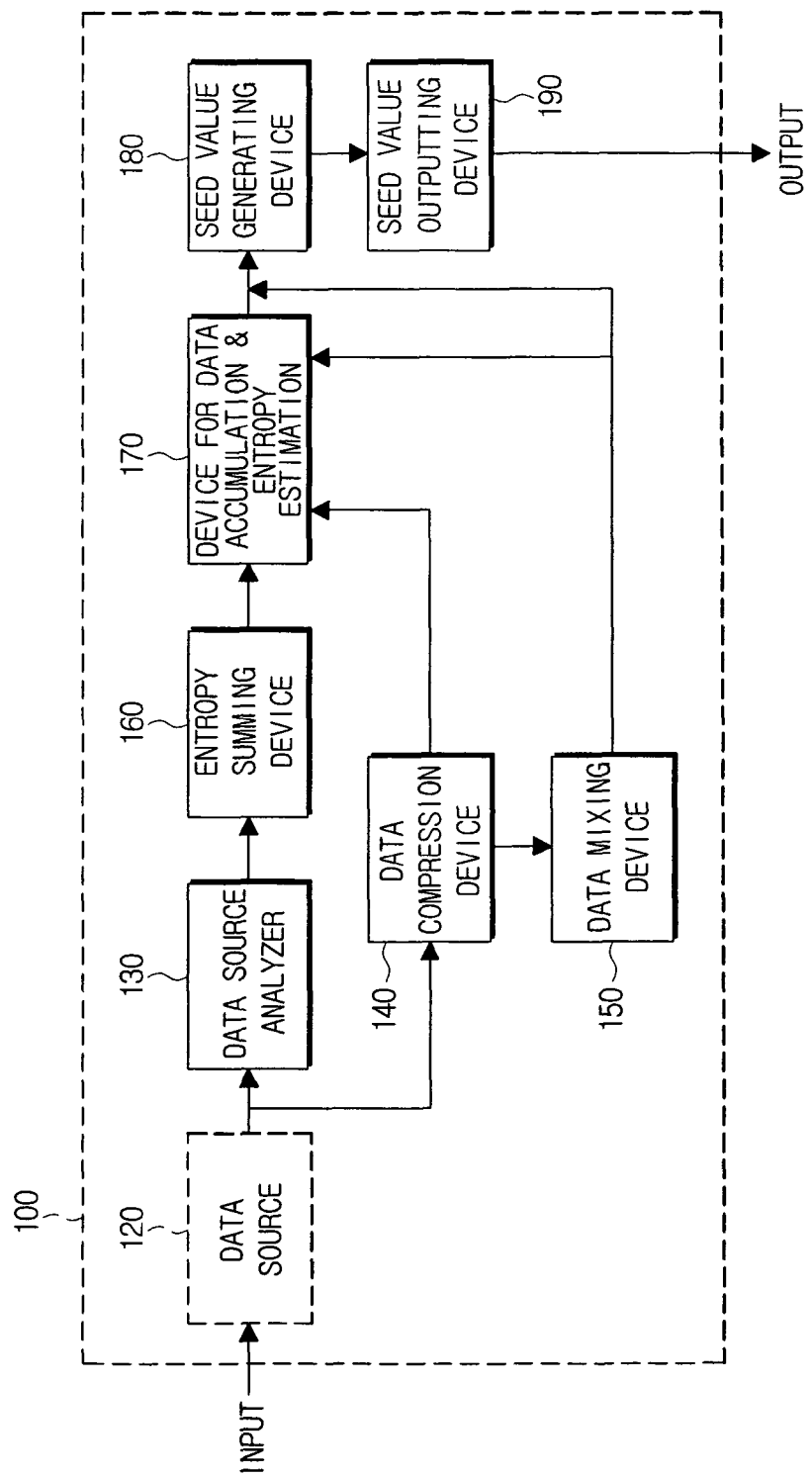
FIG. 1 is a schematic block diagram of a seed value making device according to an embodiment of the present invention.

Hereafter, description will be made on a method of fabricating a micro-needle array according to an embodiment of the present invention with reference to accompanying drawings.

The present invention is achieved by means of the fact that when the hardware random source is not available, the method of a seed value generation comprises the following operations.

First, data from various external sources representing different random processes are accumulated in proper memory units of the First Data Pool. The Data Pool may refer to the divisions of the memory (RAM).

Next, data analyses are performed for source type determination. The source type may include whether the data generation is slow or fast, or whether the data is reliable or unreliable.

The current entropy evaluations are made for each of the above-mentioned sources according to data received from this source. For each mentioned source, the current entropy is accumulated to a proper memory unit by means of summing over the evaluations with their further retention in the memory unit of the First Data Pool.

This means for retention of the entropy evaluations from only one data source. Applying hash-function to perform data compression from each source with further retention of the result in another memory unit of the First Data Pool with the mentioned memory unit is meant for retention of the mentioned compressed data from only one data source.

By applying hash-function to mix compressed data and store result to another memory unit of the First Data Pool, minimum entropy estimation is obtained on the basis of the current entropy evaluations for each mentioned reliable source.

Next, the reduced entropy estimation is computed by dividing the mentioned minimum entropy estimation by two, and sequence of reduced values is stored in the sequence of memory units of the Second Data Pool.

Then given entropy evaluations for each mentioned reliable source are accumulated with the mentioned memory unit by summing over the estimations and retention of the sums of the given estimations in the proper memory units of the Second Data Pool. This means the retention of the given sum from the only one data source.

Next performed is, for each reliable data source, retention of the mentioned compressed data in another memory unit of the Second Data Pool with the mentioned memory unit. This means the retention of the mentioned compressed data from the only one data source.

Then performed is the retention of the mentioned mixed data in the proper memory unit of the Second Data Pool for each reliable data source. For each reliable data source, the set of reduced entropy evaluations is set, which have been stored in the sequence of memory units of the Second Data Pool.

Next, computation of the conservative entropy estimation is performed, by dividing by two the prior mentioned reduced entropy evaluations. The reduced entropy evaluations are stored in the proper memory units of the Second Data Pool, and as a result, the resultant conservative value is stored in the proper memory units of the Third Data Pool.

For each mentioned reliable data source, next performed is the accumulation of the conservative entropy evaluations by means of summing over the estimations, and the retention of the sums in the sequence of memory units of the Third Data Pool is made with the mentioned memory unit. The mentioned memory unit means the retention of the mentioned sum from the only one data source.

Next, for each reliable data source, retention of the mentioned compressed data in the proper memory unit of the Third Data Pool is performed with the mentioned memory unit. The mentioned memory unit means the retention of the mentioned compressed data from the only one data source.

Then for each reliable data source, the mentioned mixed data are stored in the proper memory unit of the Third Data Pool. In the embodiment of the present invention, the following conditions need to be checked:

a) At least for the three mentioned sources, the mentioned sums of the current entropy evaluations must be not less than 128. Also, one of the mentioned sources must be fast and reliable or slow and reliable.

b) The mentioned sums of the entropy evaluations must be not less than 128 for each of the mentioned sources. Also, all these sources have to be fast and reliable or slow and reliable;

c) The mentioned sums of the conservative entropy evaluations must be not less than 128 for each of the mentioned sources. Also, all these sources have to be fast and reliable or slow and reliable.

Following the specified conditions, a new seed value for PRNG is generated by additional mixing of pooled data. The previously mixed data are stored in the proper memory units of the First and the Second Data Pools and prearranged seed value, which consists in implementation of cyclic hashing of pooled data, and is extracted from the mentioned memory units of the First and the Second Data Pool and the prearranged seed value. In one aspect of the present invention, the mentioned random processes may be in the local network of the Ethernet type, wireless local network (WLAN). The mentioned data of these random processes may include values of signal levels in the WLAN network, intervals between the incoming packets in the mentioned networks, intervals between the packets outgoing from the mentioned networks, intervals between interrupts, quantity of the mentioned interrupts.

The mixed data stored in a proper memory unit of the Third Data Pool are used to establish new seed value at the moment of external device switch on/off, which is a part of at least one of the mentioned networks.

Entropy evaluation frequencies of random event of the mentioned source are registered within certain time period, and on the basis of frequencies, the computation of the current entropy evaluations is made according the following equation 1:

$$H(\cdot) = -\sum_i p_i \log p_i, \quad \text{[Equation 1]}$$

where, $p_i$ is a probability calculated on the basis of frequency.

Each mentioned source may correspond to one of the following types: fast and reliable (FR), slow and reliable (SR), fast and unreliable (FU), slow and unreliable (SU).

FIG. 1 is a schematic block diagram of a seed value generator according to an embodiment of the present invention. If the hardware random data source is not available, device for seed value generation according to one aspect of the present invention may include a data source analyzer 130, a data compression device 140, a data mixing device 150, an entropy summing device 160, a device 170 for data accumulation and entropy estimation, a seed value generating device 180 and a seed value outputting device 190.

The mentioned data source analyzer 130 is designed to receive data from various random sources representing different random processes and to determine source type on the basis of received data.

Further, the data source analyzer 130 may be designed for computation of current entropy evaluations for each mentioned random source. The mentioned random sources are classified into types that are specified by various combinations of following features: fast/slow, reliable/unreliable.

The data compression device 140 is designed to compress data received from the data sources and outputs compressed data to the data-mixing device 150, which is designed for mixing compressed data of each data source.

The entropy-summing device is destined for summing over current entropy evaluations for each data source. The device 170 for data accumulation and entropy estimating comprises two devices to compute entropy evaluations, two summing devices and a memory divided into three areas, each of which consists of memory units set.

The first device to compute entropy evaluations is meant for computation of the entropy evaluations for each data source on the basis of current entropy evaluations derived from the data source analyzer 130 and current entropy evaluation device.

The first summing device is meant for sum computation of the given entropy evaluations for each data source. The second summing device is determined for computation of the conservative entropy evaluations for each reliable data source on the basis of selected intermediate values of the above entropy evaluations.

The above entropy evaluations are derived from the first summing device for the computation of the entropy evaluations. The summing device is meant for sums computation of conservative entropy evaluations for each reliable data source by addition of the above conservative entropy evaluations for the given data source The given data source is computed by the second device for entropy evaluations computation. The memory is destined for retention of the mentioned results of compression and mixing, which were derived from the mixing device 150 and the compression device 140. The entropy evaluations with mixing results for all the data sources are recorded to the memory units of the First Data Pool.

Data mixing results from reliable data sources are recorded in the memory units of the Second and the Third Data Pool.

The First Data Pool is destined for retention of the mentioned current entropy evaluations, which were derived in the device for analysis and calculation of the current entropy estimation.

The Second Data Pool is designed for retention of the mentioned entropy estimation, which were got in the first device for entropy estimation calculation among the two entropy estimation calculating devices.

The Third Data Pool is meant for recording of the mentioned conservative entropy estimation, which were got in the second device for entropy estimation calculation. The device for new seed value making is meant to control execution as follows:

a) At least for the above three sources, the current entropy evaluation in the First Data Pool must be not less than 128. One of the mentioned sources should be fast and reliable or slow and reliable;

b) For each of the above sources, the entropy evaluation in the Second Data Pool must be not less than 128. All the above sources must be fast and reliable or slow and reliable.

c) For each of the above sources, the mentioned entropy evaluation in the Third Data Pool must be not less than 128. All the above sources must be fast and reliable or slow and reliable.

d) If satisfying the above conditions, the device 180 for new seed value making forms a new seed value for pseudo random sequence generator by additional mixing of the mentioned mixing results, which are stored in the proper memory units of First and the Second Data Pools and prior seed value by applying the iterated cyclic hashing.

e) The device of seed value output is meant for getting of a new seed value from the device 180 for new seed value making and transmittance of a new seed value to the pseudo random sequence generator.

The above random processes may be random processes of the local network of the Ethernet type, of wireless local network (WLAN), and the data of these random processes may be values of the signal level in the WLAN network, intervals between the input packets in the above networks, intervals between the output packets in the above networks, intervals between the interrupts, quantity of the interrupts.

In one particular aspect of the present invention, a new seed value making device 180 for a new seed value making uses mixing compressed data, which are stored in the proper memory units of the Third Data Pool, at the moment of external device activation that is a part of one of the above local networks.

In another aspect of the present invention, the device 130 for source analysis and calculation of the current entropy estimation comprises a device for frequency registration of random events of the sources within determined time interval and a device for current entropy estimation calculation, which is determined for calculation of current entropy estimation on the basis of the frequencies according to the above equation 1.

In yet another aspect of the present invention, analysis device 130 for the source analysis and calculation of current entropy estimation calculates the current entropy estimation on the basis of random event frequency of the mentioned sources, which are registered by external device for frequency registration of the random event. The calculation is performed according the above equation 1.

The above entropy estimation, calculated by the first device for entropy estimation calculation, is equal to half of minimum for the determined sequence of the current entropy estimation. The entropy estimation calculated by the second device for entropy estimation calculation, is equal to half of minimum for the determined sequence of the entropy estimation.

Each source may correspond to one of the types as follows: fast and reliable (FR), slow and reliable (SR), fast and unreliable (FU), slow and unreliable (SU).

FIG. 2 is a flowchart illustrating the operational principle of the method of making seed values according to an embodiment of the present invention. Referring to FIGS. 1 and 2, data is obtained from different data sources within the predefined time period (S200), and transmitted to the seed value generator 100.

Various random processes conducting in a local network of the Ethernet type, in a local network (WLAN) may be applied as these sources. Then, the seed value generator 100 performs analysis of the received data to identify the source type (S205).

The sources are divided into types as follows: fast, slow, reliable, and unreliable.

As a result, each source may be either fast and reliable (FR), or slow and reliable (SR), or fast and unreliable (FU), and slow and unreliable (SU). Processes that can be measured or got by individuals, for example, a hacker, without access right to the inside of the device are the 'unreliable ones'. For example, these individuals can measure time intervals between the input packets or the output packets.

The reliable sources form random data that cannot be reproduced outside the system. Therefore, random processes conducting in a printer relate to reliable sources.

After performing the analysis of sources, the seed value generator 100 writes data in the First Data Pool. It has to be noted that Data Pools represent segments of continuous address space of the memory array with random access.

Additionally, it is necessary to note that data stored in the First Data Pool are used further to renew the seed value (seed) of the pseudo random number generator (PRNG) to diminish risk of compromise.

Such operation is possible even in the moment of external device activation. The external device exists at least in one of the above-mentioned networks. For example, a printer or any other device can be used as the external device.

For memory writing of the thirst area, the seed value generator 100 calculates the current entropy estimation for each data source on the basis of frequencies of random events of the sources (S210).

The frequencies can be registered by the seed value generator 100 and by the external device of random event frequency registration. The current entropy estimation for each source are calculated according the equation 1.

It has to be mentioned that the sources meet the requirements as follows:
  a) Sources are quasistationary ones, i.e. probability distribution of a random variable is permanent within long period of time or are very slowly varied;
  b) Sources are without memory, i.e. the current value of a random variable does not depend on the values this random variable had before;
  c) Sources are statically independent.

The seed value generator 100 accumulates the entropy estimations by summation of the received current entropy estimations for each data source and retention of the sums at the proper memory units of the First Data Pool (S210).

Each memory unit of the First Data Pool is determined for recording of the entropy estimation of one source. After that, the seed value generator 100 performs operations as follows (S215):
  a) Compression of data from the sources with the further retention;
  b) Mixing of the compressed data with further retention of these mixed data to the proper memory unit.

Data compression is performed by a hash-function. Hash-function SHA-256 may be applied for this purpose. US federal standards FIPS PUB 180-2 contain characterization of a hashing algorithm, calculation of a hash-function for the specified argument. It is not obligatory to use SHA-256. For example, it is possible to use standard P 34.11-94 or another one with a proper hash-function.

For SHA-256, a random sequence of bits with length of $<2^{64}$ bits can be used as an argument. The calculated value is a sequence of bits with length of 256 bits. Compression function is the principal element of a hash algorithm.

The input bit sequence of data from each mentioned data source is split into blocks of 512 bits each. Then the compression function is applied serially for each block. Thus, if length of the input sequence is not larger than 512 bits, the hashing by means of SHA-256 is taken as a single usage of a compression function. The calculation work content of hashing is a minimum one.

The compressed data for each data source are stored to the proper memory unit of the first Date Pool. Each memory unit is determined for recording data of one source only. Mixing of all compressed data for each source are performed as follows:
  a) Increase of entropy estimation sum must be not less than 32.
  b) Accumulated in the proper memory units of the First Data Pool must comprise not less than 512 bits.

Mixing of the compressed data is performed at execution of these requirements. It is performed as follows:
  a) The input bit sequence of data is forming.
  b) Concatenation of the compressed data of all data sources and of the preliminary mixing result is performed for the bit sequence with length of 256(n+1) bits, in which n is a number of equipped sources of randomness.

Then the cyclic hashing is performed by a SHA-256 hash-function. For example, for the first three chunks the cyclic hashing consists in the following.

The value for a hash-function is performed for concatenation of the first and the second chunks. The hashing result substitutes content of the first chunk.

For concatenation of the first and the third chunk, the hash-function value is calculated. The hashing result substitutes content of the second chunk. And so forth for all chunks. At the last n+1-th step, the hash-function value is calculated for concatenation of (n+1)-th and the first chunks The first chunk value is used prior to cyclic hashing start. The hashing result substitutes content of the initial (n+1)-th chunk. One iteration of the cyclic hashing is performed like this.

Full mixing is obtained by frequent application of the cyclic hashing procedure to the string. Iteration total number is equal to n. Finally string of the (n+1)-th chunk is compressed up to 256 bits by a single usage of SHA-256 function.

The mixed data are stored in the proper memory units of the First Data Pool. The compression and mixing procedures are as follows:

a) Samples are brought from different sources to a standard size;

b) Mixing of samples from the same and different randomness sources. Application of SHA-256 hash-function allows us to obtain both purposes simultaneously.

Mixing by cyclic hashing is performed only when the sufficient entropy quantity is accumulated. According to entropy counter for each source, it must be not less than 32. Samples from different randomness sources are involved in the mixing process.

Proceeding from the assumption that if SHA-256 is applied, value variation of one bit in the input string leads to value variation of the significant quantity of hashing result bits (up to 256). The updates will occur at 512 bits as the result of two cyclic hashing iteration. Thus, values of all output bits will depend on each bit value of the input string after the n-th iteration.

The known properties of cryptographic hash-functions prevent from entropy losses within the operation. Accordingly, if we assume that that all the randomness sources are taken into account, the proposed solution will provide the maximum speed of entropy bit accumulation at minimum stored data volume.

The seed value generator 100 performs filling of the Second Data Pool, when all the above operations are executed (S220). It has to be noted that data stored in the Second Data Pool are meant for automatic update of the PRNG seed value. It has to be noted that the Second Data Pool contains data got as a pessimistic approach to entropy estimation (the estimation is purposely underestimated).

Such approach assures high level of a cryptographic strength. For example, if data in the First Data Pool were got as a result of unreasonably overestimated entropy estimation, the automatic update using data from the Second Data Pool allows us to compensate this problem as follows.

The seed value generator 100 computers minimum entropy estimation for each reliable source (fast or slow) on the basis of current entropy of these sources, which were got by the above method.

For this purpose, the seed value generator 100 forms a packet that comprises, for example, eight intermediate entropy estimation, which were calculated according to the Shannon's formula. Then the minimum entropy estimation in the series is determined, and computing of the mentioned minimum entropy estimation is performed.

The intermediate entropy estimations are denoted as $f_{i-7}$, $f_{i-6}, \ldots, f_{i-1}, f_i$, in which i is a number of a series. In this case, the minimum estimation of the current entropy value of the determined source is expressed as the following equation 2:

$$s_i = \min(f_{i-7}, f_{i-6}, \ldots, f_{i-1}, f_i)/2. \quad \text{[Equation 2]}$$

Multiplier 0.5 is introduced to compensate mutual coupling effect of different sources. For example, the input packet initiates interruptions and after the certain period of time, forms the output packet. For some cases, such event can be predicted with high probability.

If the observations were performed within limited time period, selection of a minimum intermediate estimation is related to the possible instable behavior of a source, and also to risk diminution of inadequate entropy estimation as a result of the targeted attack of a violator.

The minimum entropy estimation for each source is recorded in the memory units of the Second Data Pool (S225). After this, the seed value generator 100 according to each data source accumulates entropy estimations by summation of these estimations with further retention of the accumulation results to the proper memory units of the Second Data Pool.

Sums from one source are recorded in each memory unit. Then retention of the mixed compressed data got by the above method is performed in the proper memory units of the Second Data Pool. It has to be mentioned that the mixed data only from the reliable sources are recorded in the memory units.

Data retention in the memory units of the Second Data Pool is executed the same way as retention of the First Data Pool, and particularly, data from one reliable source are recorded to each memory unit of the Second Data Pool (S230).

After completion of the above operations, the seed value generator 100 fills the Third Data Pool using the method as follows (S235). It has to be mentioned that content of the Third Data Pool is only used to load a seed value of PRNG at the activation moment of the external device which is a comprised in the networks, for example a printer.

Content of the Third Data Pool is also formed basing on pessimistic entropy estimations of reliable sources. For each reliable data source, the seed value generator 100 determines sets of the mentioned entropy estimations stored in memory units of the Second Data Pool.

Computation of the conservative entropy estimation is made basing on the sequence of estimations. This computation is similar to the computation of the mentioned entropy estimation i.e. the entropy estimation is divided by two.

We denote series of four minimum entropy estimations for the determined source as $s_{i-3}$, $s_{i-2}$, $s_{i-1}$, $s_i$, in which i is a number of series. So, the second minimum entropy estimation is:

$$p_i = \min(s_{i-3}, s_{i-2}, s_{i-1}, s_i)/2. \quad \text{[Equation 3]}$$

It is assumed that the time gap between two activations of the printing device (On/Off/On) has the needed duration that is sufficient for Third Data Pool filling. It is also assumed that sample consists of number of countings. A 'counting' means a bit sequence of some length. The second calculated minimum values of entropy estimations are also stored in the Third Data Pool.

Then, the seed value generator 100 accumulates the conservative entropy estimations for each reliable data source by summation of these entropy estimations of each reliable source with a further recording of these sums in the memory units of the Third Data Pool (S240).

Sums of one source are recorded to each memory unit. Then, the seed value generator 100 also records mixed compressed data, which were got by the above method, to the proper memory units of the Third Data Pool.

The data recording is performed analogously as data retention to the proper memory units of the Second Data Pool, i.e. mixed data from one source is recorded in each memory unit.

The rule of a value distribution by three Data Pools has been determined:

*RF-source: for 5 successive samples*
Two samples in the First Data Pool,
Two samples in the Second Data Pool, and
One sample in the Third Data Pool.
*SR-source: for 7 successive samples*
Four samples in the First Data Pool
Two samples in the Second Data Pool
One sample in the Third Data Pool.
*FU-source: for 5 successive samples*
Three samples in the First Data Pool Two samples in the Second Data Pool
*SU-source: for 7 successive samples*
Five samples in the First Data Pool
Two samples to the Second Data Pool Therefore, for example, if eight sources are comprised—four reliable and four unreliable—the first and the Second Data Pools have similar sub pools each (S245).

The Third Data Pool comprises four similar sub pools. After performing of the above operations, the seed value generator 100 controls execution of requirement as follows:

a) At least for three mentioned sources, the mentioned sums of the current entropy estimations have to be not more than 128, and one mentioned source must be fast and reliable or slow and reliable, b) For each of the mentioned sources, the sums of entropy estimations must be not less than 128, and all the sources must be fast and reliable or slow and reliable, and c) For each of the mentioned sources, the sums of conservative entropy estimations must be not less than 128, and all the sources must be fast and reliable or slow and reliable.

If the requirements are fulfilled (S250), the seed value generator 100 forms a new seed value for the PRNG (S255). In order to form a new seed value, the seed value generator 100 joints the mentioned mixed compressed data stored in the proper memory units of the First and the Second Data Pools and the prior seed value of the PRNG with iterative cyclic hashing of the joint data extracted from the memory units of the First and the Second Data Pools, and the prior seed value.

It has to be noted that forming a new seed value for PRNG seed value generator uses content of the Third Data Pool only at the moment of switching on a device, for example, a printer. Steps of data joining and received data hashing will be described below in more details.

As it has been stated before, mixed compressed data of the proper sources are stored in the First and the Second Data Pools. Each of the chunks has 256 bits. The prior seed value of the PRNG also has 256 bits.

Therefore, bit sequence length after concatenation is equal to 768. Iterative cyclic hashing based on SHA-256 function is performed at the second stage similar to the mixing procedure. A bit chunk 512 bits is transmitted to the hash-function input. Then, the first 256 bit of the input chunk substitutes the hashing result. The computation method consists in serial data hashing of the input sequence with the fixed shift to 256 bits.

We will denote a hash-function as $H(\bullet)$, input block $B_i$, and two sub blocks $s_{i1}$ and $s_{i2}$, $B_i = S_{i1} \| S_{i2}$. Let's suppose that the input string of 768-bits long consists of one block $B_1$ and one sub block $S_{21}$.

Thus, if the hashing result is applied to block $B_1$, the result of $H(B_1) \| S_{12} \| S_{21}$ will be derived. For the next step, we will apply hash function to block $S_{12} \| S_{21}$. The result is equal to $H(B_1) \| H(S_{12} \| S_{21}) \| S_{21}$.

At the final step, we will apply a hash-function to the concatenation of the first and the second sub blocks with the $H(B_1) \| H(S_{12} \| S_{21}) \| H(H(B_1) \| S_{21})$ result. Three iterations have to be performed for a full renew. After the second iteration the result is as follows:

$$H(H(B_1) \| H(S_{12} \| S_{21})) \| H(H(S_{12} \| S_{21}) \| H(H(B_1) \| S_{21})) \| H(H(B_1) \| S_{21}) \| H(H(B_1) \| H(S_{12} \| S_{21}))).$$

The block hashing of 512 bits is performed in case of a seed value renew at switching on of a printing device. The seed value generator 100 transmits to the PRNG the new seed value. Basing on the new seed value, the PRNG forms new pseudo random numbers, which are further used to form a password, cryptography keys etc.

The above method is realized by the seed value generator 100 for a PRING.

Referring again to FIG. 2, the seed value generator 100 according to an embodiment of the present invention comprises, connected with each other, an analysis device 130 for data source analysis and current entropy estimation calculation, a data compression device 140, a data mixing device 150, an entropy estimations summation device 160, a device 170 for data accumulations and entropy estimation calculation, a device 180 for a new seed value making and a device 190 for a seed value output to a PRNG. FIG. 1 also shows data sources marked by number 120.

The components of the seed value generator 100 according to an embodiment of the present invention will be described below. Referring to FIG. 1, the analysis device 130 is designed to receive data from various sources representing different random processes, and determine source type according to the received data.

The data compression device 140 compresses the received data and transmits the compressed data to the data mixing device 150. The data mixing device 150 is designed to mix the compressed data from the respective sources.

The entropy estimations summation device 160 sums the current entropy estimations with respect to each source. The device 170 for data accumulations and entropy estimation calculation includes a memory which is divided into three regions each including two entropy estimation calculation units, two summation units and a plurality of memory units. The quantity of memory parts depends on the number of sources.

The first entropy estimation calculation unit of the device 170 calculates the entropy estimations for each data source basing on current entropy estimations of the given data source got from the device 130 for analysis of types of sources, and calculates current entropy estimation.

The first summation unit calculates sums of the entropy estimations for each data source by summation of above entropy estimations of the data source.

The second entropy estimation calculation device selects the intermediate values from the number of the entropy estimations for each reliable source, which were got in the first entropy estimation calculation device, and then calculates conservative entropy estimations for each reliable data source based on these selected intermediate values.

The second summation unit summarizes conservative entropy estimations for each reliable data source by means of summation of the mentioned conservative entropy estimations of the given source, which were computed by the second estimation computation device.

The memory retains the result of compression and mixing of the data compression device 140 and the mixing device 150, and the entropy estimations. All the mixed compressed data are recorded in the memory part of the First Data Pool. The mixed data results from the reliable sources are recorded in the memory parts of the Second and the Third Data Pools.

The First Data Pool retains the current entropy estimations, the Second Data Pool retains the entropy estimations obtained from the first entropy estimation calculation device, and the Third Data Pool records the conservative entropy estimations obtained from the second entropy estimation calculation device.

The seed value generator 100 controls the following performances:

a) At least for the above three sources, the sum of the current entropy estimations in the First Data Pool must be not less than 128. One of the mentioned sources must be fast and reliable or slow and reliable;

b) Sum of the mentioned entropy estimations in the Second Data Pool must be not less than 128 for each of the above source. All the mentioned sources must be fast and reliable or slow and reliable;

c) Sum of the mentioned entropy estimations in the Third Data Pool must be not less than 128 for each of the above sources. All the mentioned sources must be fast and reliable or slow and reliable.

d) In order to meet the above conditions, the device 180 for a new seed value making forms the new seed value for the PRNG by combining the mixed compressed data that is stored in proper memory units of the First and the Second Data Pools and the prior seed value for the PRNG by iterative cyclic hashing of the data and the preliminary seed value. The method discloses in details the seed value making procedure.

e) The device 190 for a seed value output to a PRNG receives and transmits the new seed value to the PRNG.

It has to be noted that the devices, excluding the data sources 120, may have the hardware or software realization. If the data source analyzer 130 has a hardware realization, basing on the elements AND and OR, it represents a processor or any combinational circuit.

The device for frequency registration of random events of the data source analyzer 130 may exist outside, instead of being in the data source analyzer 130, and in this case, the operational principles are as follows:

First, the data source analyzer 130 receives data from various data sources 120 representing various processes. The data source analyzer 130 applies the above method based on the received data, and also calculates current entropy estimations with respect to the respective sources.

In order to calculate current estimations, the data source analyzer 130 receives data from the device for frequency registration of random events. The data source analyzer 130 calculates current frequency based on the received data.

The current entropy estimations are transmitted to the entropy summing device 160. The entropy summing device 160 sums the received current entropy estimations for each source 120 based on the current entropy estimations.

The entropy summing device 160 transmits the sums of estimations to the device 170 for data accumulation and entropy estimation, which operates as follows:

The first entropy estimation calculation unit of the device 170 calculates the entropy estimations for each data source basing on current entropy estimations of the given data source got from the device 130 for analysis of types of sources.

The process of calculating the estimations has already been explained above. The estimations are transmitted to the first summation unit. The summation unit calculates sums of entropy estimations of each of the data sources, by summing over the entropy estimations of the data sources.

The second entropy estimation calculation device selects the intermediate values from the number of the entropy estimations for each reliable source, and then calculates conservative entropy estimations for each reliable data source based on these selected intermediate values. The calculation algorithms have already been explained above.

The second summation unit summarizes conservative entropy estimations for each reliable data source by means of summation of the mentioned conservative entropy estimations of the given source, which were computed by the second estimation computation device.

The compression device 140 gets data from the sources 120, and compresses data by the method mentioned above.

From the compression device 140, the compressed data go to the data mixing device 150 that mixes the received data. The mixing procedure and the performance conditions have already been disclosed above.

The memory writes the mixed compressed data got from the data source analyzer 130 and the entropy summing device 160.

The mixed compressed data for all the sources are written in memory units of the First Data Pool. The compressed mixed data from reliable sources is written in the memory units of the Second and Third Data Pools.

Writing in the memory is performed according to the disclosed method, and particularly, mixed compressed data from one of the mentioned sources 120 is written in each mentioned memory unit.

Additionally, current entropy estimations formed in the data source analyzer 130 are registered in the proper memory units of the Third Data Pool. The entropy estimations formed in the first entropy estimation computation device are registered in the proper memory unit of the Second Data Pool.

The entropy estimations got in the first entropy estimation computation device are registered in the proper memory units of the Second Data Pool. The entropy estimations formed in the second estimation computation device are registered in the proper memory units of the Third Data Pool.

Data formed in the accumulation device 170 and the mixing device 150 is transmitted to the device 180 for a new seed value making. The device 180 controls execution of the conditions as follows:

a) At least for three mentioned sources, the sum of the current entropy estimations in the First Data Pool must be not less than 128. One of the mentioned sources must be fast and reliable or slow and reliable;

b) Sum of the mentioned entropy estimations in the Second Data Pool must be not less than 128 for each of the mentioned source. All the mentioned sources must be fast and reliable or slow and reliable;

c) Sum of the mentioned entropy estimations in the Third Data Pool must be not less than 128 for each of the mentioned sources. All the mentioned sources must be fast and reliable or slow and reliable.

If the conditions are met, the device 180 forms the new seed value for the PRNG by combining the mentioned mixed compressed data that is stored in proper memory units of the first and the Second Data Pools and the prior seed value for the PRNG by iterative cyclic hashing of the data and the preliminary seed value.

The seed value making procedure has been discussed above in detail. When the new seed value is formed, the seed value generating device 180 transmits the formed value to the seed value outputting device 190. The seed value outputting device 190 transmits the new seed value to the PRNG.

The PRNG, basing on the new seed value, forms new pseudo random numbers. Basing on these numbers, the passwords and cryptographic keys are formed.

As described above in a few exemplary embodiments of the present invention, in generating a seed value, dynamic estimation of random sources rate, and classification of sources on slow and fast ones, and reliable and unreliable ones can be provided, and also, seed values can be made with taking in account rate and reliability of the sources.

The foregoing embodiments and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A seed value making method for a PRNG (Pseudo Random Number Generator), the method comprising:
   accumulating in memory units of a First Data Pool data from various external sources;
   analyzing the data to determine a source type;
   computing entropy estimations for each of the external sources based on the source type as determined and a probability calculated based on a frequency of random event appearance of the external sources within a certain time period; and
   generating a seed value by iterative cyclic hashing the entropy estimations and the data accumulated in the memory units of the First Data Pool.

2. The method of claim 1, wherein the data includes values of signal levels in a WLAN network, intervals between incoming packets in a local network, intervals between packets outgoing from the local network, intervals between the interruptions, and a quantity of the mentioned interruptions.

3. The method of claim 2, wherein the seed value is generated at the moment of switching on an external device.

4. The method of claim 3, wherein the First Data Pool represents segments of continuous address space of a memory array with random access.

5. The method of claim 4, wherein the entropy estimations are computed according to the formula as follows:

$$H(\cdot) = -\sum_i p_i \log p_i,$$

in which $p_i$ is the probability calculated based on the frequency of random event appearance of the external sources within a certain period of time.

6. The method of claim 5, wherein the source type includes at least one of fast and reliable (FR), slow and reliable (SR), fast and unreliable (FU), and slow and unreliable (SU).

7. A device for forming a seed value for a PRNG (Pseudo Random Number Generator), the device comprising:
   a data source analysis device to receive data from sources, determine a source type based on the received data, and perform entropy calculations for each of the sources based on the source type and a probability calculated based on a frequency of random event appearance of the sources within a certain time period;
   a data compression device to compress data received from the sources;
   a data mixing device to receive the compressed data from the data compression device and mix the received compressed data;
   an entropy estimation summation device to sum the entropy estimations for each of the sources;
   a device for data accumulation and entropy estimation forming, to accumulate the data from each of the sources; and
   a device for a new seed value making, to generate a seed value by iterative cyclic hashing the entropy estimations and the accumulated data.

8. The device of claim 7, wherein the data includes values of signal levels in a WLAN network, intervals between incoming packets in a local network, intervals between packets outgoing from the local network, intervals between the interruptions, and a quantity of the mentioned interruptions.

9. The device of claim 8, wherein the device for a new seed value making generates the seed value at the moment of switching on an external device constituting the local network.

10. The device of claim 9, wherein the data source analysis device comprises:
    a device for frequency registration of random events, which registers the frequency of random events of the sources within a predetermined period of time; and
    a device for current entropy estimation computation, which is determined for calculation of current entropy estimations based on the probability calculated based on the frequency of random event appearance of the sources within a certain time period, according to the formula as follows:

$$H(\cdot) = -\sum_i p_i \log p_i,$$

in which $p_i$ is a probability calculated based on the frequency of random event appearance of the sources within a certain period of time.

11. The device of claim 9, wherein the data source analysis device computes the current entropy estimations on the basis of random event frequency of the sources, according the formula as follows:

$$H(\cdot) = -\sum_i p_i \log p_i,$$

in which $p_i$ is a probability calculated based on the frequency of random event appearance of the sources within a certain period of time.

12. The device of claim 10, wherein the frequency of random event appearance of the sources is registered in an external device provided for the registration of the frequency of random event appearance.

13. The device of claim 12, wherein the source type includes at least one of fast and reliable (FR), slow and reliable (SR), fast and unreliable (FU), and slow and unreliable (SU).

* * * * *